United States Patent [19]

Cobb et al.

[11] 4,301,713

[45] Nov. 24, 1981

[54] APPARATUS FOR SUPPLYING FLUID TO A PLURALITY OF MECHANISMS

[75] Inventors: R. Paul Cobb, Washington; Marvin L. Schneider, Peoria, both of Ill.

[73] Assignee: Caterpillar Tractor Co., Peoria, Ill.

[21] Appl. No.: 967,543

[22] Filed: Dec. 7, 1978

[51] Int. Cl.³ .......................................... F01B 31/10
[52] U.S. Cl. .................................. 91/46; 91/516; 91/517; 91/536
[58] Field of Search .................. 91/516, 532, 536, 46, 91/517; 60/484

[56] References Cited

U.S. PATENT DOCUMENTS

| | | | |
|---|---|---|---|
| 2,941,639 | 6/1960 | Christenson | 91/532 |
| 3,895,703 | 7/1975 | Schmitt | 137/625.69 |
| 3,922,855 | 12/1975 | Bridwell | 60/484 |
| 3,998,111 | 12/1976 | Blake | 91/516 |
| 4,004,779 | 1/1977 | Flesburg | 91/536 |
| 4,140,196 | 2/1979 | Brewer | 60/484 |

*Primary Examiner*—Abraham Hershkovitz
*Attorney, Agent, or Firm*—Phillips, Moore, Weissenberger, Lempio & Majestic

[57] ABSTRACT

The invention relates to apparatus for supplying pressurized fluid to various controlled members (16,30,34). A problem with prior apparatus is the need for a plurality of separate apparatuses to supply the controlled members. The invention solves this problem through the use of a single valve (25) that controls the supply of pressurized fluid from a fluid source to first (34), second (16) and third (30) controlled members, in which the single valve (25) has a first relief valve segment (46) to relieve the pressure of fluid flowing from the source to the first controlled member (34), a second relief valve segment (100) to relieve the pressure of fluid relieved by the first relief valve segment (46), and a third valve segment (138) to direct the fluid relieved by the first relief valve segment (46) to the second (16) and third (30) controlled members. A movable lever (26) is connected to the third valve segment (138) to shift this valve segment (138) and control the direction of the fluid. The invention is used principally in hydraulic circuits for earthworking vehicles to actuate a plurality of controlled members including a flywheel clutch and clutch brake, and steering clutches and vehicle brakes.

16 Claims, 6 Drawing Figures

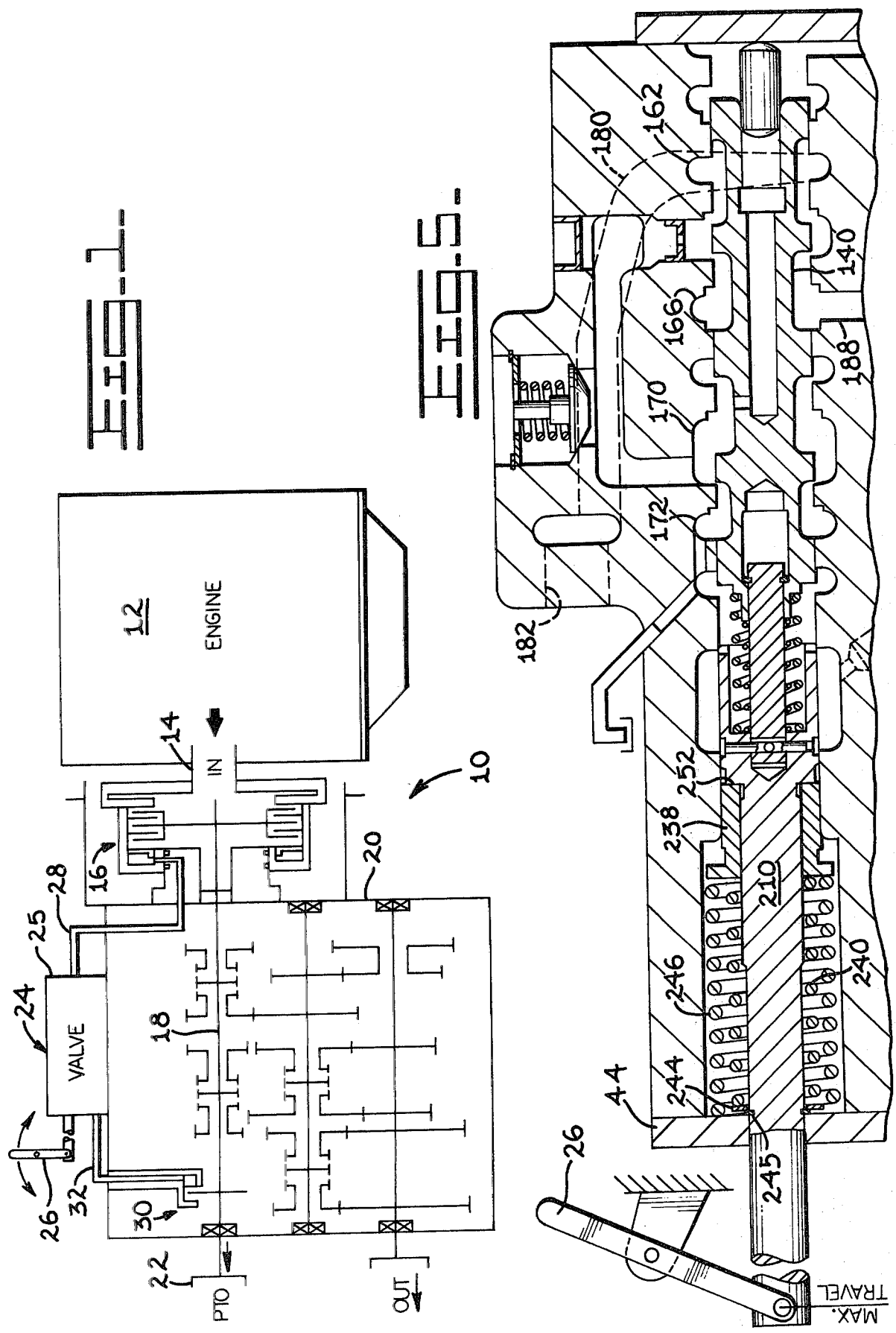

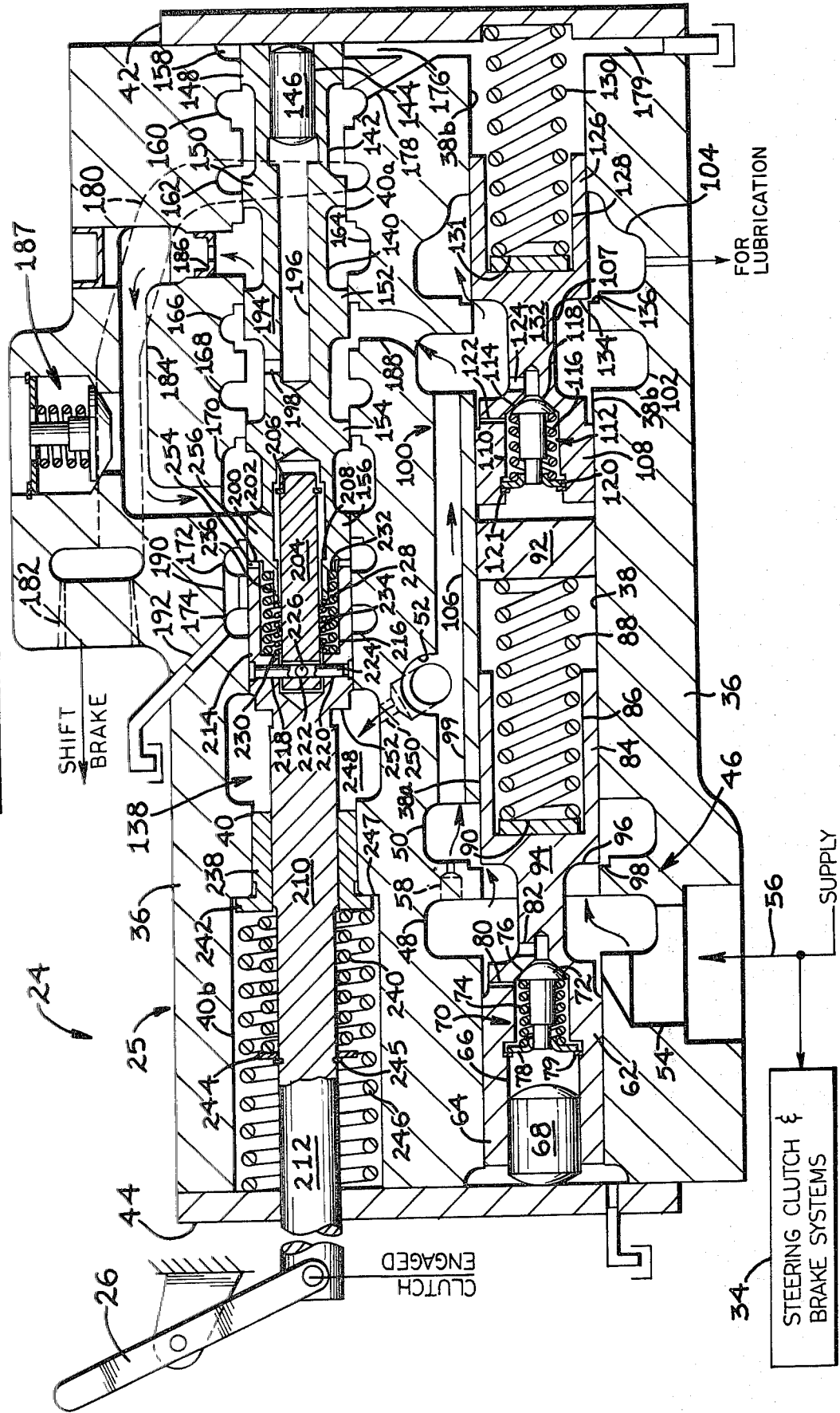

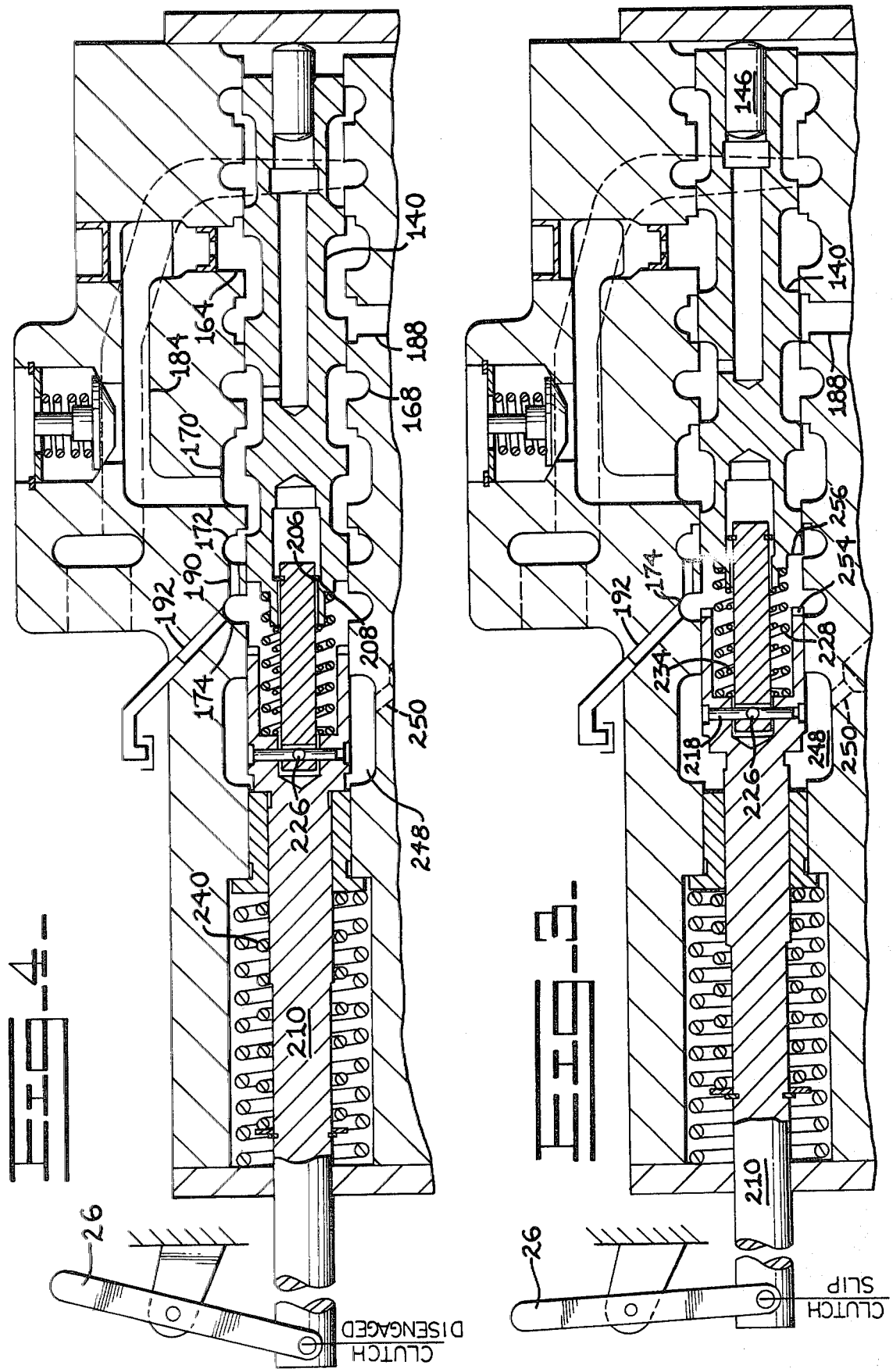

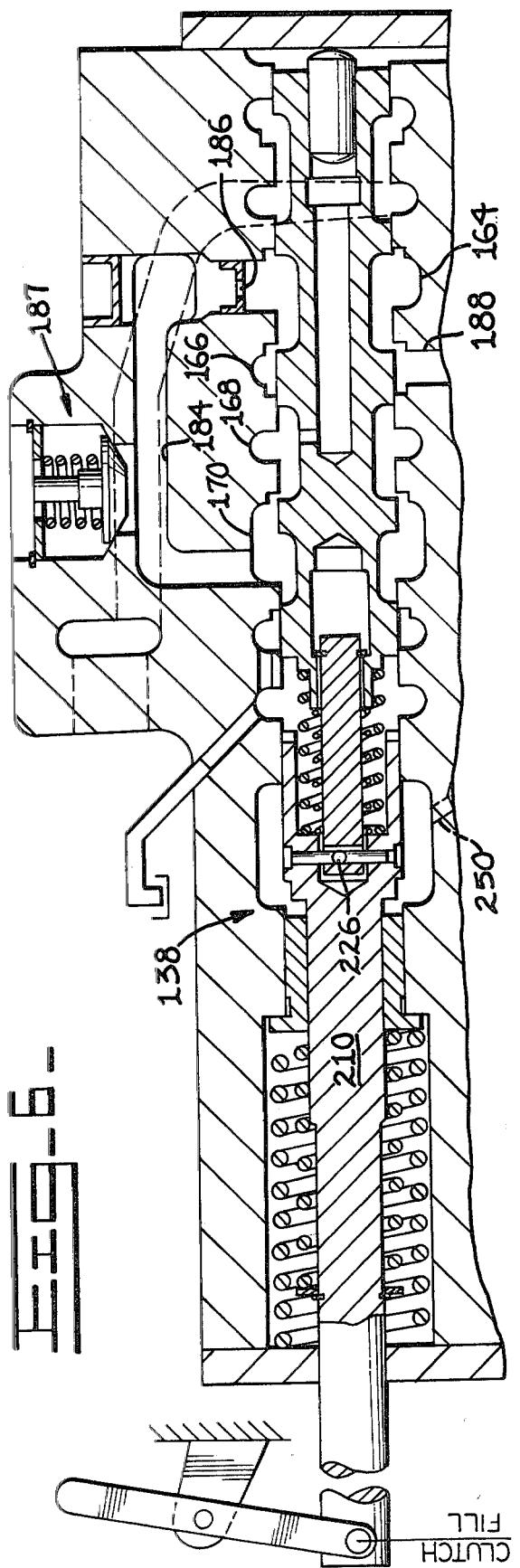

APPARATUS FOR SUPPLYING FLUID TO A PLURALITY OF MECHANISMS

DESCRIPTION

1. Technical Field

This invention relates to apparatus for supplying pressurized fluid to various controlled members, and more particularly, to a single control valve responsive to movement of a lever to supply fluid pressure to a flywheel clutch and clutch brake and to supply fluid pressure to other controlled members such as a steering clutch and vehicle brakes.

2. Background Art

In earthmoving vehicles, such as large tractors, hydraulic circuits have been provided to supply various controlled members or systems with pressurized fluid during operation of the vehicle. For example, it is common practice to couple an engine drive shaft to an output shaft of a power train through a flywheel clutch. The clutch is engaged and disengaged in response to pressurized fluid supplied through a lever operated control valve in a hydraulic circuit. This valve can also control the supply of pressurized fluid to a clutch brake operatively coupled to the output shaft to brake this shaft when the flywheel clutch is disengaged. Additional control valves are utilized to supply pressurized fluid to other controlled members such as steering clutches and vehicle brakes.

A disadvantage with the prior arrangements is the need for a plurality of separate control valves and levers to supply flywheel clutches, clutch brakes, steering clutches and vehicle brakes with controlled pressurized fluid. This makes the hydraulic system both complicated and relatively expensive to manufacture. Moreover, the prior art has not provided a lever and single valve control which has the desirable features of (1) providing the vehicle operator with feedback or feel of the flywheel clutch pressure including feel for flywheel clutch engaged and disengaged positions which duplicate the over center control characteristics of conventional flywheel clutches, (2) controlling the maximum pressure supplied to the flywheel clutch, (3) supplying a controlled pressure to the steering clutches and vehicle brakes, (4) providing a circuit for filling the flywheel clutch in the shortest possible time, but at a pressure low enough to not move the vehicle suddenly upon completion of the fill, (5) providing a circuit for applying a clutch brake operatively coupled to the flywheel clutch output shaft, and (6) providing feel for the application of the flywheel clutch brake.

DISCLOSURE OF INVENTION

The present invention is directed to overcoming one or more of the problems as set forth above.

According to the present invention, there is provided apparatus for supplying pressurized fluid from a fluid source to first, second and third systems responsive to fluid pressure, comprising valve means for controlling the supply of pressurized fluid from the source to the first, the second and the third systems, and lever means for shifting said valve means to supply the pressurized fluid to the first and the second systems.

The technical problems with the prior art are that the prior devices are relatively complicated and expensive to manufacture and do not provide all the desirable features mentioned above in a lever and single valve control. These problems are solved by the inventive apparatus for supplying pressurized fluid, as given above. An advantage of this invention is that inexpensive and simple fluid control apparatus having these features can be provided.

BRIEF DESCRIPTION OF DRAWINGS

FIG. 1 is a diagrammatic side elevational view of a transmission arrangement including a lever and single valve control of the present invention.

FIG. 2 is a sectional view of an embodiment of the lever and valve control of the invention in one position.

FIGS. 3-6 are sectional views similar to FIG. 2 showing the lever and the upper part of the valve control in other positions.

BEST MODE FOR CARRYING OUT THE INVENTION

In FIG. 1 there is shown a vehicle power train 10 which can be used, for example, in a vehicle such as a track-type tractor. The power train 10 includes an engine 12 having an output shaft 14 which is driven by the engine 12. A flywheel clutch controlled member 16 couples the output shaft 14 to a driven shaft 18 of a transmission 20, the shaft 18 being arranged on a common axis with the engine output shaft 14. Driven shaft 18 extends through the transmission 20 to provide power take-off (PTO) for a member 22 which can be, for example, a vehicle accessory such as a conventional winch or the like.

A fluid control system 24 includes a single control valve 25 which is manually operated by the vehicle operator through movement of a single control lever 26. The valve 25 controls the supply of pressurized fluid, preferably oil, to the flywheel clutch 16 shown through a first path shown generally at 28 and the supply of pressurized fluid to a brake or controlled member 30, operatively associated with the flywheel clutch output shaft 18, through a second fluid path shown generally at 32. The system 24 also controls the supply of pressurized fluid to other controlled members or systems 34 (see FIG. 2), particularly steering clutches and vehicle brakes of the vehicle.

Details of the system 24 will now be described in relation to FIG. 2. The control valve 25 of system 24 includes a main body 36 having respective lower and upper longitudinal bores 38 and 40 extending from one end plate 42 to another end plate 44 of the valve 25. A main relief valve shown generally at 46 is slidably received along one area 38a of the bore 38. A plurality of grooves 48, 50 and 52 are disposed in relation to the bore area 38. The main body 36 has a fluid inlet 54 which communicates fluid, pumped from a supply, with the groove 48, in which the inlet 54 receives the fluid via a line 56. The fluid in line 56 also is directed to the steering clutch and vehicle brake members 34. A flow-limiting orifice 58 maintains continuous communication between the groove 48 and groove 50.

The main relief valve 46 also includes a spool 62 which is slidable within the bore area 38a. On end 64 of spool 62 has a stepped bore 66 in which is received a slug 68 and a poppet valve 70, the end 64 being slidable along the slug 68. The poppet valve 70 includes a head 72 which is biased by a spring 74 into engagement with a seat or shoulder 76 of the spool 62. The spring 74 is connected between the head 72 and a valve collar 78 which is connected to the spool end 64 by a ring 79. The collar 78 has openings (not shown) through which fluid can flow. Spool 62 has a narrow passage 80 communicating fluid pressure from groove 48 with the stepped bore 66 through collar 78 to act against the slug 68. A larger passage 82 communicates fluid pressure from groove 48 to move the head 72 off shoulder 76 against the bias of spring 74 to communicate this fluid pressure with the bore 66 and slug 68.

Spool 62, at its other end 84, has another bore 86 in which is received a return spring 88 disposed between a shoulder 90 of spool 62 and a block 92 which is fixed within bore 38. Spool 62, at its central portion 94, has a shoulder 96 which is biased towards a shoulder 98 of body 36 by the return spring 88. As indicated by the arrows in FIG. 2, when shoulder 96 moves away from shoulder 98, fluid in the annular groove 48 is relieved or flows between shoulders 96 and 98 into groove 50 and then along an elongated passage 99 within the body 36 to the groove 52. Thus, as will be further described, main relief valve 46 controls the pressure of fluid in line 56 to the controlled members 34.

A flywheel clutch relief valve shown generally at 100 is also slidably received within the bore 38 at another bore area 38b which has annular grooves 102 and 104. Relief valve 100, as will be described, controls the pressure of the fluid relieved through main relief valve 46, to a maximum pressure required for activating the clutch 16. An elongated passage 106 within body 36 communicates the fluid at groove 52 with groove 102.

The relief valve 100 includes a spool 107 having at its one end 108 a bore 110 in which is positioned a poppet valve 112. This poppet valve 112 has a head 114 which is biased by a spring 116 into engagement with a seat or shoulder 118 of the spool 107. Spring 116 is connected between the head 114 and a valve collar 120 which is connected to the spool end 108 via a ring 121, the collar 120 having openings (not shown) for the passage of fluid therethrough. Spool 107 has a narrow passage 122 at one side of head 114 communicating the fluid within annular groove 102 with the bore 110 to act against the fixed block 92, and another larger passage 124 communicating the fluid in annular groove 102 with the other side of head 114 to move it off the seat 118, thereby also communicating this fluid with the bore 110.

The spool 107, at its other end 126, has a bore 128 for receiving a return spring 130 connected between the end plate 42 and a shoulder 131 of the spool 107. At its central portion 132, the spool 107 includes an annular shoulder 134 which is biased by the spring 130 towards an annular shoulder 136 of the body 36.

The upper half of the main body 36 of control valve 25 slidably supports within upper bore 40 a manually controlled modulation valve shown generally at 138. This valve 138, among other functions to be described, controls the pressure supplied to the flywheel clutch 16 and provides a circuit for supplying the brake 30 with pressurized fluid.

The modulation valve 138 includes a modulating piston or spool 140, shown to the right of FIG. 2, which slides along a bore area 40a of the bore 40. Piston 140 has at its one end 142 a bore 144 in which is positioned a fixed modulating slug 146. The piston 140 has a plurality of lands 148, 150, 152, 154 and 156 which cooperate with a plurality of annular grooves or passages 158, 160, 162, 164, 166, 168, 170, 172 and 174 of bore portion 40a.

Annular grooves 158 and 160 lead to respective drain passages 176 and 178 which combine into a common drain passage 179 leading through the bore portion 38b. Annular chamber 162 is in communication with a fluid passage 180 which leads to an outlet 182 for delivery of fluid to the brake 30 via conduit 32 (see FIG. 1). Annular groove 164 communicates fluid with the annular groove 170 through a passage 184 having a flow restrictor 186, the annular grooves 164, 170 and passage 184 constituting a circuit for filling the flywheel clutch 16. A relief valve 187, in communication with passage 184, limits the clutch fill pressure to a preset value for reasons which will be described.

Annular groove 166 is in communication with the annular groove 102 of bore 38 through a passage 188 to receive the fluid relieved by valve 46. The annular groove 166 also communicates with the annular groove 168 which has a passage (not shown) leading to the conduit 28 (see FIG. 1) to supply the clutch 16 with pressurized fluid. Annular chamber 172 communicates through a passage 190 with the annular chamber 174 which drains fluid via a passage 192.

At its central portion 194, the modulating piston 140 has a bore 196 receiving pressurized fluid in grooves 166 and 168 through a passage 198, this fluid acting against the modulating slug 146 whereby the piston 140 tends to move to the left as viewed in FIG. 2. The other end 200 of piston 140, where lands 154 and 156 are located, has a stepped bore 202 slidably receiving a portion of a connecting rod 204 having a ring 206 at one end. As will be more fully described, connecting rod 204 is capable of sliding to the left as viewed in FIG. 2, whereby ring 206 will contact a shoulder 208 of piston 140 to move the latter to the left.

The modulation valve 138 also includes a spool 210 which is pivotally connected at one end 212 to the control lever 26 that is movable by the vehicle operator. At its other end 214, the spool 210 defines a bore 216 in which is received the other part of the connecting rod 204. This end 214 has two openings 218 and 220 aligned with a bore 222 in the connecting rod 204. A hollow, open ended, connecting pin 224 extends through openings 218 and 220 and bore 222 to connect spool 210 to the connecting rod 204. Pin 224 has a central hole 226 to communicate pressurized fluid from its ends within openings 218 and 220 with the annular chamber 174.

A first modulating spring 228 is disposed between a shoulder 230 of spool 210 and a shoulder 232 of piston 140. Another modulating spring 234 is disposed between the shoulder 230 and another shoulder 236 of the piston 140. Springs 228 and 234 have different resiliency from one another and aid in modulating the fluid pressure on the flywheel clutch 16, as will be more fully described.

A sleeve 238, through which the spool 210 is slidable, is itself slidably coupled to the main body 36 within the bore 40. A clutch disengagement spring 240 is disposed between a flange 242 of sleeve 238 and a collar 244 which acts against a ring 245 fixed to the spool 210. A brake resistance spring 246 is connected between the shoulder 242 and the end plate 44 in a bore portion 40b. Spring 240 is biased to bring the modulation valve 138 into a position for disengagement of the clutch 16 while spring 246 is preloaded to hold flange 242 against a shoulder 247 of body 36.

An annular chamber 248 receives pressurized fluid from the groove 52 of lower bore 38 through a flow limiting orifice 250. This pressurized fluid acts on a shoulder 252 of the spool 210 to bias the valve 138 into a clutch engaged position.

INDUSTRIAL APPLICABILITY

With reference to FIG. 2, the control system 24 is shown with the lever 26 in a position placing the valve 25 in a position in which the clutch 16 is engaged and the brake 30 disengaged.

Pressurized fluid from the supply flows via line 56 into the annular groove 48 and to controlled members 34. The pressurized fluid in groove 48 also flows through passage 80 and ring 78 into bore 66 to act against the slug 68, thereby slowly moving spool 62 to the right against the force of return spring 88. The fluid in groove 48 also acts against shoulder 96 of spool 62. If the supply pressure builds up, the fluid in passage 82 moves head 72 off the shoulder 76 to act against the slug 68, thereby moving spool 62 more quickly to the right.

As the spool 62 moves to the right against return spring 88, shoulder 96 moves away from shoulder 98 so that excess or relieved fluid is relieved from annular groove 48, between shoulder 96 and shoulder 98, and into the groove 50. From groove 50, the relieved fluid flows through passage 99 into the annular groove 52, as well as along slot 106 into annular groove 102 to be available to activate the clutch 16 or brake 30.

When the main relief valve 46 is closed, i.e., when shoulder 96 is adjacent shoulder 98 as, for example, would occur during low idle operation of the vehicle engine since the fluid pressure in groove 48 would not be sufficient to move spool 62 against the bias of spring 88, there will still be fluid flow through orifice 58. This flow will continue through passages 99 and 106 into groove 102 so that fluid will be available to activate the clutch 16 or brake 30. Consequently, during low idle operation, engagement of the controlled members 34 need not result in disengagement of the clutch 16.

As pressurized fluid enters groove 102, it flows through passage 122 into bore 110 and against the fixed block 92 to move spool 107 slowly to the right against the force of return spring 130; this fluid also acts against shoulder 134 of spool 107. If pressure builds up in groove 102, the flow through passage 124 moves head 114 off shoulder 118 to provide additional pressure against block 92, thereby moving spool 107 more quickly to the right against the force of spring 130. As spool 107 moves to the right, shoulder 134 moves away from shoulder 136 to open the relief valve 100, thereby relieving fluid pressure in groove 102 for communication with groove 104. While not shown in the drawings, groove 104 can be connected to a passage which communicates the excess or relieved fluid with various vehicle components for lubrication purposes.

As already noted, FIGS. 2-6 illustrate respective positions of the manual modulation valve 138 for supplying the flywheel clutch 16 and brake 30 with pressurized fluid. The valve 138 is controlled by a vehicle operator manually moving the control lever 26 through various positions, which will now be described.

FIG. 2 shows the valve 138 in the position for engaging the flywheel clutch 16. In this position, the end 214 of spool 210 has an annular shoulder 254 which is in contact with an annular shoulder 256 of land 156 of piston 140 to hold the latter in the position shown. Pressurized fluid flows from the groove 102 through passage 188 and into annular grooves 166 and 168. From groove 168 the pressurized fluid flows into conduit 28 (see FIG. 1) to engage the flywheel clutch 16. Pressurized fluid also flows from the annular groove 166, through passage 198, and into bore 196 where it acts against the modulating slug 146 tending to move the piston 140 to the left to close passage 188 and disengage the clutch 16. Similarly, the clutch disengagement spring 240, which is compressed in this clutch engaged position, acts on the collar 244 and ring 245 tending to move the spool 210 to the left, which would thereby provide space for piston 140 to move to the left. However, the forces provided by the slug 146 and spring 240 are counteracted by fluid pressure within chamber 248 which receives fluid from the annular groove 52 through the flow limiting orifice 250. The pressure in chamber 248 thus acts on the shoulder 252 of spool 210 against such forces to hold the valve 138 in the position shown and, hence, the flywheel clutch 16 engaged. It is to be noted that in this FIG. 2 position, modulating springs 228 and 234 are fully compressed.

When the operator rotates control rod 26 clockwise so that spool 210 is moved to the left to the position shown in FIG. 3, the modulating springs 228 and 234 will have reached their full length, i.e., they will not be compressed and the clutch 16 will slip. In this position, the pressure in chamber 248 is relieved through the ends of hollow pin 218 and opening 226 to drain through the groove 174 and passage 192. Also at this position, piston 140 is not held by the contact of spool 210 against piston 140 via shoulders 254 and 256 to open passage 188, but is held in position by the springs 228 and 234 to close passage 188. Therefore, the pressure on the flywheel clutch 16 is modulated by balancing the pressure acting against the modulating slug 146 with the light force of the modulating springs 228 and 234. In the position shown in FIG. 3, the clutch 16 will slip at low pressure to enable, for example, fine inching control of power take-off device 22.

It will be appreciated that in the intervening positions of the spool 210 between its position shown in FIG. 2 and its position shown in FIG. 3, there will be continual modulation of the pressure on the flywheel clutch 16. As spool 210 moves from its FIG. 2 position to its FIG. 3 position, the pressure in chamber 248 will be relieved to drain as described above and shoulders 254 and 256 will not be in contact so that spool 210 does not hold piston 140 in the position shown in FIG. 2. The compression in the modulating springs 228 and 234 will be reduced during the leftward movement of spool 210 so that lower and lower clutch pressure will be required for balancing the forces acting on the slug 146 with the forces produced by the modulating springs 228 and 234. During this leftward movement, spring 234 will first reach its free length so that the clutch pressure will only have to be balanced against a relatively "soft" spring 228. Continued movement to the position shown in FIG. 3 will then cause the spring 228 to reach its free length. Travel of spool 210 leftward from the FIG. 2 position to the position at which spring 234 has reached its full length can be used, for example, for picking up a load. Travel of the spool 210 between the position at which spring 234 has reached its full length and the FIG. 3 position at which spring 228 has reached its full length can be used for slipping the clutch at low pressure for fine inching control, as indicated above. As the piston 140 moves leftward from the FIG. 2 position to the FIG. 3 position, passage 188 will become more and more closed.

To disengage the flywheel 16, the operator can move the spool 210 further leftward to the position shown in FIG. 4 by further rotating clockwise the lever 26. During this movement from the FIG. 3 position to the FIG.

4 position, the ring 206 on the connecting rod 204 will contact the shoulder 208 of piston 140. Consequently, piston 140 will be pulled to the left by the ring 206 to the FIG. 4 position. In this position, the clutch 16 will be disengaged by shutting off its supply from the passage 188 and annular groove 168 and venting this supply to the drain through the groove 164, passage 184, groove 170, groove 172, passage 190, groove 174 and passage 192. The clutch 16 also communicates with drain via groove 168 and groove 170.

The spool 210 is held in this clutch disengaged position by the clutch disengagement spring 240. The clutch disengagement spring 240 is biased such that release of the lever 26 by the operator at positions between the FIG. 2 and FIG. 4 positions will result in the spool 210 being driven to the FIG. 4 position for disengagement of the flywheel clutch 16.

Also, the lever 26 will automatically return to the FIG. 4 or neutral position when the supply pressure in line 56 drops to a specified level. Such a drop in pressure will result in a similar pressure drop in chamber 248, whereby lever 26 will move to the FIG. 4 position. The supply pressure will be at this specified level when the vehicle operator "kills" the engine or upon engine start-up. This feature assures that at engine start-up the vehicle drive train is disconnected from the engine, and the vehicle will not suddenly move. Current mechanically applied clutches can be left engaged at engine start-up and can result in sudden vehicle movement.

Further movement of the spool 210 to the left from the FIG. 4 position to the FIG. 5 position will result in the shoulder 252 contacting and moving the sleeve 238 to the left to compress preloaded spring 246. Consequently, piston 140 also will be pulled further to the left, as viewed in FIG. 5, thereby communicating the passage 188 and annular groove 166 with the annular groove 162 and substantially closing groove 170 to groove 172. Pressurized fluid will thereby flow from the annular groove 162 through the passage 180 and outlet 182 to conduit 32 (see FIG. 1) for stopping or braking the shaft 18. Actually, it can be seen that the brake circuit including the passage 180 and outlet 182 will be pressurized at an intermediate position between the FIG. 4 and FIG. 5 positions of spool 210 for braking action. The maximum travel or leftward movement of the spool 210, as shown in FIG. 5, is limited by the collar 244 and ring 245 on the spool 210 contacting the end plate 44. As the lever 26 is moved to the FIG. 5 position, spring 246 will become compressed and provide "feel" for the operator to sense that the clutch brake 30 is being applied. If the operator releases the control lever 26 while it is in the position shown in FIG. 5, the spool 210 will return to the clutch disengagement position shown in FIG. 4 by the action of spring 240 and spring 246.

With the clutch 16 disengaged and the brake 30 engaged when the lever 26 and spool 210 are in the position shown in FIG. 5, reengagement of the clutch 16 is accomplished by moving the spool 210 to the right, i.e., rotating lever 26 in a counterclockwise direction. For example, to pick up a load, the operator will move the spool 210 from the position shown in FIG. 4 (clutch disengaged) to the position shown in FIG. 2 (clutch engaged) at a rate of his choice to give smooth clutch engagement. Chamber 248 will be pressurized by the fluid passing from groove 52 through the flow limiting orifice 250 to maintain the spool 210 in the clutch engaged position. As can be appreciated from the above discussion, the pressure in the chamber 248 will be different when lever 26 is in the clutch engaged position as compared to the clutch disengaged position. This difference can be "felt" or sensed such that the operator will know when control valve 25 is in the clutch engaged or clutch disengaged position, thereby simulating the over center control characteristics of conventional flywheel clutches.

For inching capability, the operator may desire to slip the clutch 16 at a low pressure, as already described. This can be done by slowly moving the lever 26 from the FIG. 4 position so that the spool 210 moves slowly to the right. The valve 138 will thereby reach a position shown in FIG. 6, which is a clutch fill position, in which pressurized fluid will flow from the passage 188 and annular groove 166 into the annular groove 164 and through the orifice 186, passage 184 and annular groove 170 to groove 168 to fill the clutch. It will be appreciated that as spool 210 is moved into the position shown in FIG. 6, the clutch will be filled starting from a maximum flow to a minimum flow. The operator can continue to move the lever 26 until the proper inching pressure is attained.

The relief valve 187 coupled to passage 184 limits the clutch fill pressure to a preset value which will not overcome vehicle drag, but is high enough to fill quickly the clutch 16, preferably in less than 0.3 seconds. Without the valve 187, it is possible for the operator to select or move the lever 26 to a position of low clutch pressure, but because of a long clutch fill time at this low pressure, the operator can overreact and move the lever 26 to a position of higher clutch pressure. Consequently, upon completion of the fill, the clutch pressure can be higher than desired and the vehicle can move suddenly.

Other aspects, objects and advantages of this invention can be obtained by a study of the drawings, the disclosure and the appended claims.

We claim:
1. Apparatus (24) for supplying pressurized fluid from a fluid source to first (16), second (30) and third (34) controlled members responsive to fluid pressure, comprising:
   (a) valve means (25) for controlling the supply of pressurized fluid from the source to the first (16), the second (30) and the third (34) controlled members, including
      (i) first means (46) for relieving pressurized fluid supplied to the third (34) controlled member, and
      (ii) means (50, 99, 102, 106, 138) for directing pressurized fluid relieved by said first relieving means (46) to the first (16) and the second (30) controlled members, including means (138) for modulating the pressurized fluid directed to the first (16) controlled member, said modulating means (138) including
         (1) piston means (140) for controlling the flow of pressurized fluid to the first (16) controlled member, said piston means (140) being movable to a plurality of positions, and
         (2) means (210, 228, 234) for biasing said piston means (140) into one or more of the positions; and
   (b) movable lever means (26) for shifting said valve means (25) to supply fluid to the first (16) and the second (30) controlled members.

2. Apparatus (24) according to claim 1 wherein said biasing means (210,228,234) includes means (210,228,234) for providing a plurality of biasing forces on said piston means (140) in response to different positions of said lever means (26).

3. Apparatus (24) according to claim 2 wherein said means (50,99,102,106,138) for directing further includes second means (100) for relieving the pressurized fluid directed to the first (16) and second (30) controlled members.

4. Apparatus (24) according to claim 3 wherein said second (100) means for relieving includes means (104) for conducting the fluid relieved by said second relieving means (100) from said valve means (25) for use as lubricating fluid.

5. Apparatus (24) according to claim 1 wherein said means (50, 99, 102, 106, 138) for directing further includes:
   (a) a main body (36) having an elongated bore (40) and a first passage (188) in communication with said first means (46) for relieving; and wherein
   (b) said piston means (140) communicates said first passage (188) with the first controlled member (16) or the second controlled member (30) through said bore (40).

6. Apparatus (24) according to claim 5 wherein said main body (36) further includes a second passage (166, 168) having an inlet coupled to said bore (40) and an outlet connectable to the first controlled member (16), and a third passage (184) having an inlet coupled to said bore (40) and an outlet coupled to said inlet of said second passage (166, 168) through said bore (40).

7. Apparatus (24) according to claim 6 wherein said piston means (140) includes means (140) for opening said first passage (188) to said inlet of said third passage (184) through said bore (40) and opening said outlet of said third passage (184) to said inlet of said second passage (166, 168) to supply fluid to fill the first controlled member (16), and for opening said first passage (188) to said second passage (166, 168) to supply an additional amount of fluid to activate the first controlled member (16) while closing said first passage (188) to said third passage (184).

8. Apparatus (24) according to claim 1 wherein said biasing means (210, 228, 234) includes a first spring (228) and a second spring (234), said first spring (228) having different resilience than said second spring (234).

9. Apparatus (24) according to claim 5 wherein said main body (36) further includes a second passage (250) communicating a portion of the fluid directed by said directing means (50, 99, 102, 106, 138) with said bore (40), and wherein said means (210, 228, 234) for biasing said piston means (140) into one or more of the positions includes at least one spring (228) and spool means (210) for sliding within said bore (40) and being acted on by the fluid in said second passage (250) to compress said one spring (228).

10. Apparatus (24) according to claim 1 wherein said valve means (25) further includes means (248) for moving said movable lever means (26) to a predetermined position in response to a supply pressure dropping to a predetermined level.

11. Apparatus (24) according to claim 1 wherein said piston means (140) directs pressurized fluid to the second controlled member (30) while preventing pressurized fluid from actuating the first controlled member (16).

12. Apparatus (24) according to claim 1 wherein said valve means (25) further includes means (210, 248) for sensing activation of the first controlled member (16).

13. Apparatus (24) according to claim 12 wherein said sensing means (210, 248) senses fluid pressure.

14. Apparatus (24) according to claim 1 wherein said valve means (25) further includes means (210, 246) for sensing activation of the second controlled member (30).

15. Apparatus (24) according to claim 14 wherein said sensing means (210, 246) includes a spring (246) having a variable compression and means (210) for varying the compression of said spring (246) in response to activating the second controlled member (30).

16. Apparatus (24) according to claim 1 wherein said means (138) for modulating includes a single main body (36), said piston means (140) and said biasing means (210, 228, 234) being supported in said single main body (36).

* * * * *